(12) United States Patent
O'Brien

(10) Patent No.: US 6,668,583 B2
(45) Date of Patent: Dec. 30, 2003

(54) SINGLE-PIECE HELICAL CONNECTOR FOR ADJUSTABLE OR FIXED LENGTH JEWELRY USING CORD-TYPE CONSTRUCTION

(76) Inventor: Thomas O'Brien, 100 Hudson St., Apt. 2A, New York, NY (US) 10013

( * ) Notice: Subject to any disclaimer, the term of this patent is extended or adjusted under 35 U.S.C. 154(b) by 31 days.

(21) Appl. No.: 10/054,109

(22) Filed: Nov. 13, 2001

(65) Prior Publication Data

US 2003/0089127 A1 May 15, 2003

(51) Int. Cl.⁷ .............................. A44C 5/00; A44B 1/04
(52) U.S. Cl. ............................. 63/3.1; 63/3.2; 24/128; 24/131 C
(58) Field of Search ................... 63/3.1, 3.2; 24/131 C, 24/131 R, 129 C, 128, 115 N

(56) References Cited

U.S. PATENT DOCUMENTS

| | | | | |
|---|---|---|---|---|
| 358,397 A | * | 2/1887 | Hurd ........................ | 24/131 C |
| 555,770 A | * | 3/1896 | Hisley ....................... | 24/129 R |
| 1,495,912 A | * | 5/1924 | Liefer ........................... | 24/18 |
| 2,142,952 A | * | 1/1939 | Rathgeber ...................... | 24/18 |
| 2,697,894 A | * | 12/1954 | Graham et al. ................. | 43/24 |
| 3,224,060 A | * | 12/1965 | Ogden ....................... | 24/116 A |
| 3,250,309 A | * | 5/1966 | Gyllenberg ............. | 152/213 R |
| 4,413,381 A | * | 11/1983 | Fidock ...................... | 24/131 C |
| 6,338,185 B1 | * | 1/2002 | Solterbeck ................ | 24/131 C |

* cited by examiner

Primary Examiner—Andrea Chop

(57) ABSTRACT

A single-piece connector which can be used as a clasp for jewelry items using cord type construction with a stop element, whereas the cord being any and all materials having the flexible proprieties of cord (i.e. string, rope, monofilament, leather, etc.). A connector consisting of a section as means to anchor the connector to one end of the jewelry item and a series of spaced coils to receive, secure, and release the second loose end along with methods for adjusting the length of the jewelry items using the connector.

6 Claims, 4 Drawing Sheets

SINGLE-PIECE HELICAL CONNECTOR FOR ADJUSTABLE OR FIXED LENGTH JEWELRY USING CORD-TYPE CONSTRUCTION

FIELD OF THE INVENTION

This invention relates to a connector and relates particularly, though not exclusively, to a connector used as 1. A clasp for attaching two ends of a necklace that use a cord construction, whereas the cord being any and all materials having the flexible proprieties of cord (i.e. string, rope, monofilament, leather, rubber, snake chain), with a stop element and 2. In addition to the above, a method by which said connector will allow or not, adjustment of the size/length of said necklace.

BACKGROUND OF THE INVENTION

A typical necklace made by a jeweler consists of three components 1. The item or items shown (i.e. beads, pendants, barrels) 2. A length of cord or chain on which it hangs, is threaded, or attached to in some manner and 3. The clasp which connects the two ends of the necklace forming a closed loop which enables the necklace to hang about the neck of the wearer.

The typical clasp consists of two mated pieces permanently attached to each end of the necklace thus creating a fixed size, which when coupled and uncoupled allows the wearer to put on or remove the said necklace.

The jeweler/manufacturer must create two separate parts for each clasp and perform two connecting operations in the production of each necklace. The jeweler/manufacturer when using a permanently attached clasp must commit to one size, thus having to produce different size necklaces in different quantities according to what the jeweler/manufacturer believes the end user (wearer) may purchase.

BRIEF SUMMARY OF THE INVENTION

The present invention decreases the number of parts needed to produce a clasp down to one and the number of connecting operations during production down to one.

The present invention passes on to the end user (wearer) the method by which, with little or no expertise, the necklace can be sized to the wearer's particular body and the continued ability to wear the said necklace at various lengths. Thus the present invention allows the jeweler/manufacturer to eliminate the guesswork of what sizes will sell, over production of non-selling sizes and the refitting of unsold merchandise.

BRIEF DESCRIPTION OF VIEWS OF DRAWINGS

In the drawings:

FIG. 10 shows an alternative embodiment with the Anchor Ring coiled from the outward side in.

DETAILED DESCRIPTION OF THE INVENTION

Figure 1:
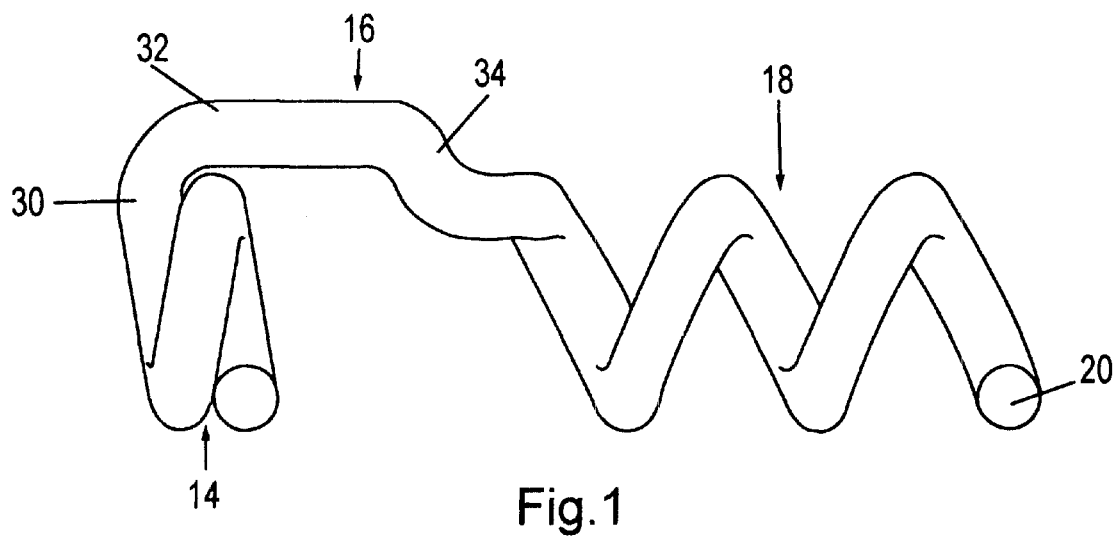
FIG. 1 shows the present invention, a Single-piece Helical Connector for Adjustable or Fixed Length Jewelry Using Cord-type Construction.

FIG. 1 shows the present invention in the preferred embodiment for performing the operation of a clasp on a cord-type necklace and which will allow the end user (wearer) to adjust the size of the necklace. The preferred embodiment is made from precious or non-precious metal, of a predetermined thickness 20. An alternative embodiment can be made from any and all materials having rigid or semi-rigid properties that will allow the present invention to hold its shape (i.e. plastic, wood, rubber). The preferred embodiment of the present invention is a one-piece structure that consists of three sections, an Anchor Ring 14, a Connecting Bar 16, and a Helix 18.

Figure 2A:
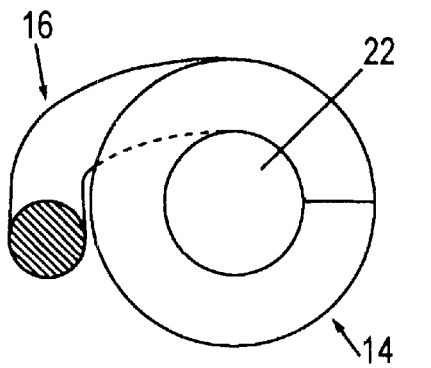
FIG. 2a shows a sectional view of the Anchor Ring, rotated 90° forward, from the inward side.
Figure 2B:
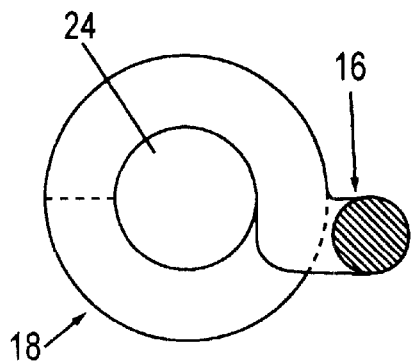
FIG. 2b shows a sectional view of the Helix, rotated 90° forward, from the inward side.
Figure 3:
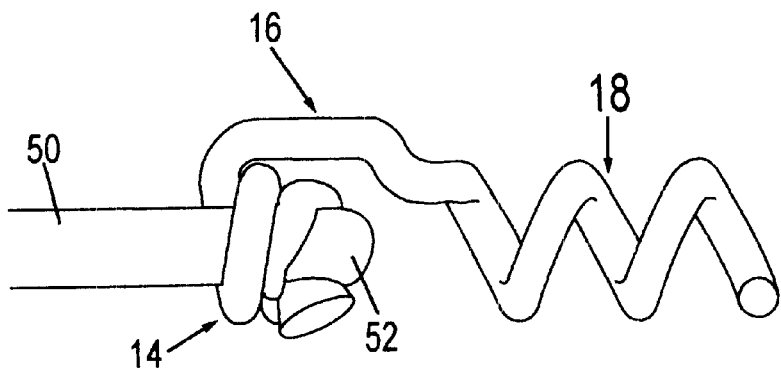
FIG. 3 shows the Anchor side necklace cord anchored to the present invention.
Figure 9:
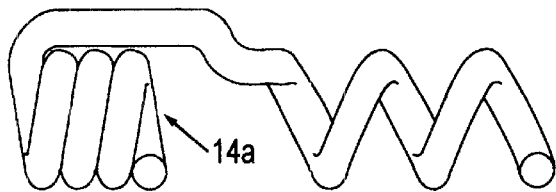
FIG. 9 shows an alternative embodiment with an increase of coils in the Anchor Ring.
Figure 10:
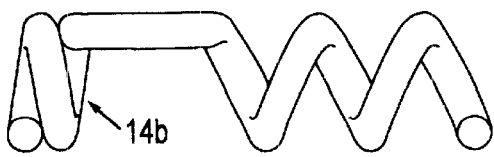
Figure 11:
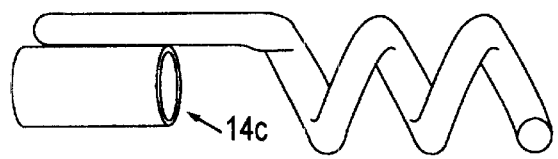
FIG. 11 shows an alternative embodiment with the Anchor Ring as a tube.
Figure 12:
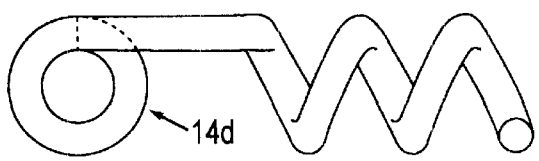
FIG. 12 shows an alternative embodiment with the Anchor Ring at an angle to the Helix

The first section of the present invention in the preferred embodiment is the Anchor Ring 14, which anchors the present invention to an anchor side length of the necklace cord 50 (FIG. 3). In the preferred embodiment the metal used is coiled outward from the inward side, to form the Anchor Ring 14 (FIG. 1) with an opening 22 (FIG. 2a) whose size can accommodate the diameter of the cord used in the construction of the necklace. The number of coils forming the Anchor Ring 14a (FIG. 9) can vary in an alternative embodiment. The Anchor Ring 14b (FIG. 10) in an alternative embodiment can have the metal coiled from the outward side inward. In an alternative embodiment the Anchor Ring 14c (FIG. 11) can be a tube. In the preferred embodiment the Anchor Ring Opening 22 (FIG. 2a) is in line with an opening 24 (FIG. 2b) in the Helix 18. Alternative embodiments can have the Anchor Ring 14d (FIG. 12) at various angles to the opening of the Helix.

In the preferred embodiment the Anchor side length of the necklace cord 50 is threaded through the Anchor Ring 14 and secured by an Anchor side knot 52 (FIG. 3). The knot 52 larger than that of the Anchor Ring Opening 22 (FIG. 2a), tied into the length of the Anchor side cord 50 is a stop element preventing the Anchor side cord 50 from passing back out through the Anchor Ring 14. This method of securing the Anchor side of the necklace cord 50 allows the size of the necklace to be adjusted on the Anchor side of the necklace when needed (see FIG. 7). In an alternative embodiment any item larger than the Anchor Ring opening 22 (FIG. 2a) or the Helix opening 24 (FIG. 2b), can be attached, connected, or formed to the end of the necklace cords as a stop element to secure the necklace cord ends. Another alternative embodiment can attach (i.e. tie, glue, solder) the Anchor side of the necklace cord 50 directly to the Anchor Ring 14 (FIG. 8), though this does not allow adjustment on the Anchor side of the present invention it does not hinder the present invention's use as a clasp.

Figure 5:
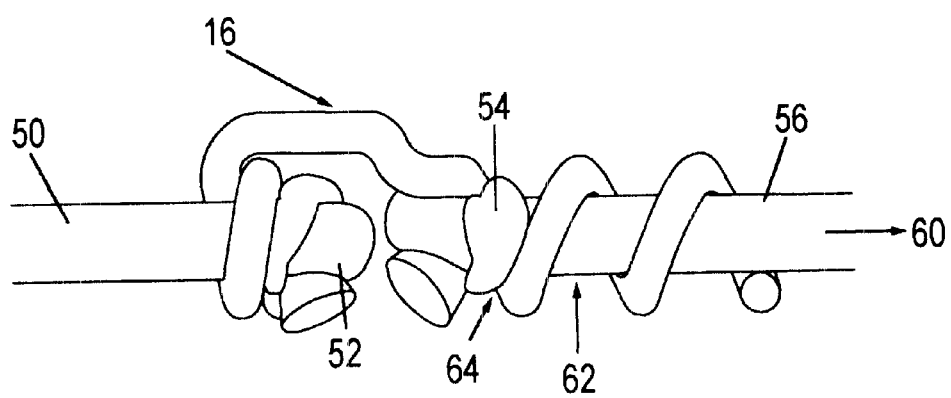
FIG. 5 shows both the Anchor side necklace cord and the Helix side necklace cord attached to the present invention.

The second section of the preferred embodiment is the Connecting Bar 16 (FIG. 1), which connects the Anchor Ring 14 and the Helix 18. In the preferred embodiment where the Anchor Ring 14 is coiled from the inward side out the Connecting Bar 16 extends from the outward side 30 of the Anchor Ring 14, over the outside 32 of the Anchor Ring 14, bends 34 into the orbit of the Helix, and then turns 36 (FIG. 2) into the inner end of the Helix 18. The turn 36 (FIG. 2) in the Connecting Bar 16 leaves a space between the Connecting Bar 16 and the second coil 38 of the Helix 18 able to accommodate the diameter of the cord used in the construction of the necklace. In the preferred embodiment the length of the Connecting Bar 16, and thus the space between the Anchor Ring 14 and the Helix 18 is sufficient to allow the Anchor side knot 52 and a Helix side knot 54 sit facing each other though not touching (FIG. 5). The length of the Connecting Bar 16 can vary in an alternative embodiment.

Figure 13:
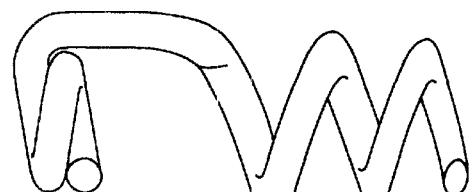
FIG. 13 shows an alternative embodiment with the series of spaced coils conical.

The third section of the present invention is the Helix 18 (FIG. 1), a series of spaced coils 42 (FIG. 2) where a length of the Helix side of the necklace cord 56 (FIG. 5) is connected, secured, and released. In the preferred embodiment the Helix consists of 2.5 coils, with an opening 24 (FIG. 2b) able to accommodate the diameter of the cord used in the construction of the necklace. In the preferred embodiment the coils 42 of the Helix are spaced a distance from one another that will accommodate the diameter of cord used in the construction of the necklace. The number of spaced coils can vary in an alternative embodiment. Another alternative embodiment can have the series of spaced coils conical 18a (FIG. 13).

Figure 2:
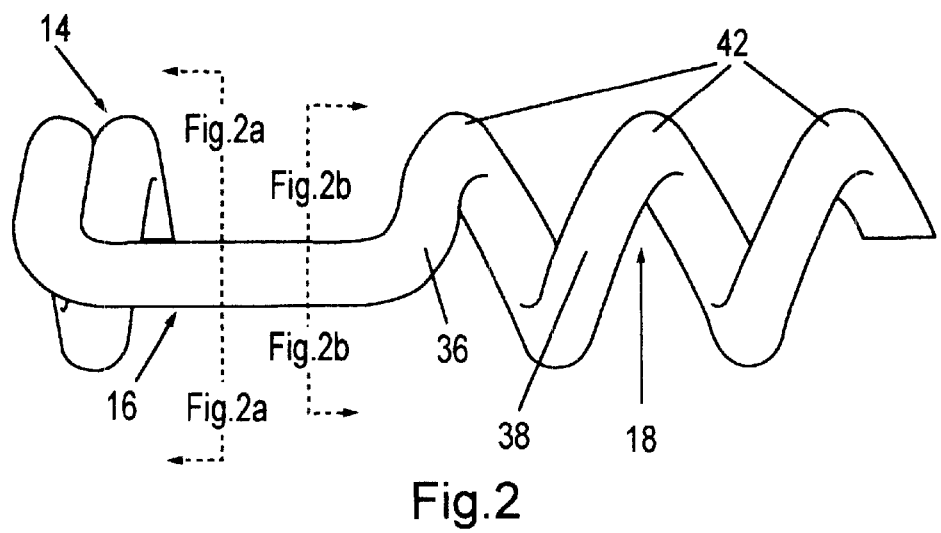
FIG. 2 shows the present invention rotated 90° forward.
Figure 4:
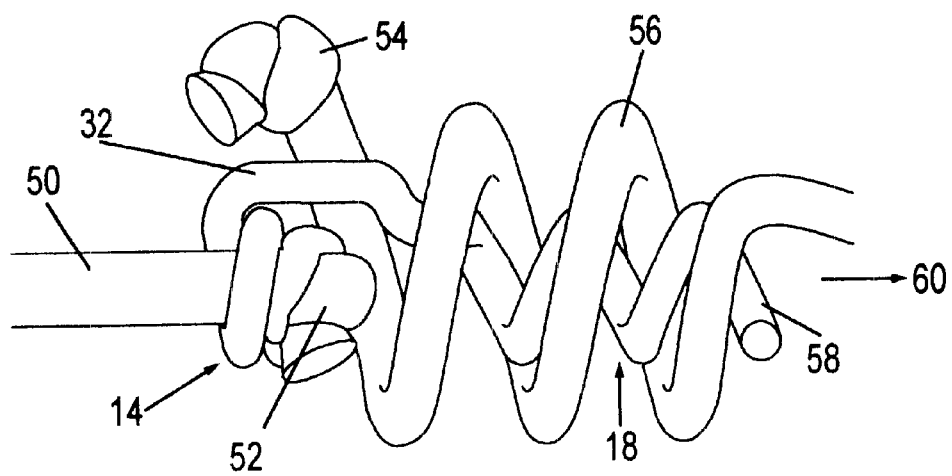
FIG. 4 shows the method of attachment for the Helix side necklace cord to the present invention.

The method by which the present invention operates as a clasp (FIG. 4) is as follows. With the Anchor side of the necklace cord 50 secured in the Anchor Ring 14, the knot 54 is tied in the loose Helix side length of the necklace cord 56 and held at a point 32 where the Connecting Bar 16 comes over the Anchor Ring 14. Then as the Helix side knot 54 is held, the Helix Side of the necklace cord 56 is wrapped around the Helix 18 following the direction of the Helix coils 42 (FIG. 2). At the outward end 58 (FIG. 4) of the Helix the Helix side cord 56 is pulled outward 60 along the Helix's center line. The Helix side cord 56 is pulled into the center 62 (FIG. 5) of the coil, the Helix side knot is let go and seated 64 (FIG. 5) at the inward side of the Helix unable to pull through the Helix 18 securing the Helix side cord 56. Thus having performed the closing operation of a clasp (FIG. 5). The opening/releasing operation is performed by holding the Connecting Bar 16 and the seated Helix side knot 54 (FIG. 5), taking the Helix side cord 56 and wrapping it in the direction opposite that of the Helix coils 42 till the Helix side cord 56 is free from the present invention.

Figure 6:
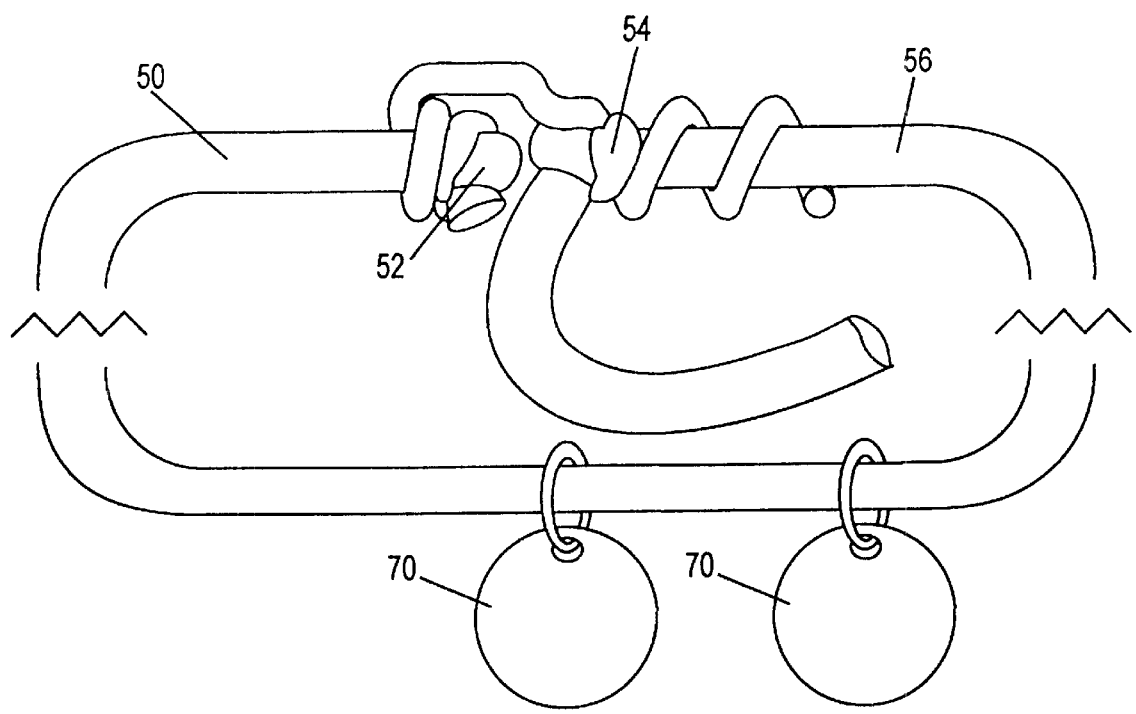
FIG. 6 shows a size adjusted necklace with a threaded jewelry ornament.
Figure 7:
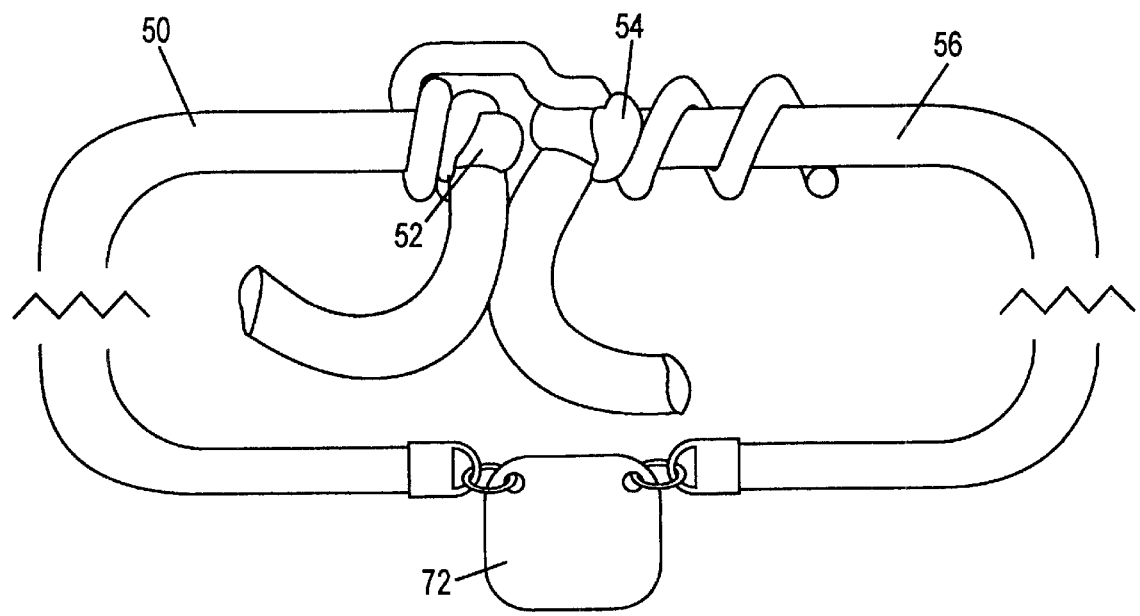
FIG. 7 shows a size adjusted necklace with a jewelry ornament hung between the Anchor side cord and the Helix side cord.
Figure 8:
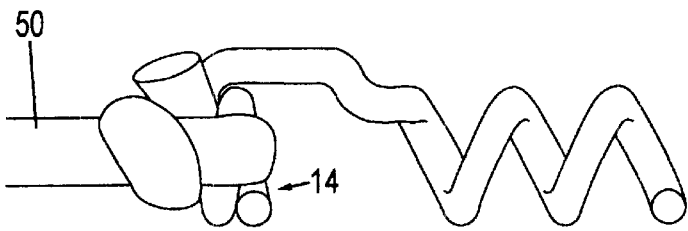
FIG. 8 shows an alternative embodiment with the Anchor side cord tied directly to the Anchor Ring.

The preferred embodiment of the present invention allows for the adjustment of the size of the attached necklace under at least two common conditions (FIG. 6 and FIG. 7). In FIG. 6 the necklace attached to the present invention has a jewelry ornament 70 threaded onto one continuous cord. The ornament 70 is able to slide along the length of the necklace, in this case (FIG. 6) the method by which the necklace is be made shorter or longer is by moving the knot 54 along the length of Helix side cord 56 or the knot 52 along the length of Anchor side cord 50. In an alternative embodiment where the Anchor side cord 50 is attached to and not through the Anchor Ring 14 (FIG. 8), the size/length adjustment can only be made on the Helix side of the necklace cord 56. In FIG. 7 the preferred embodiment of the present invention, has the Anchor side cord 50 and the Helix side cord 56 attached to two sides of a jewelry ornament 72, the ornament 72 is not able to slide along the cord of the necklace. The method in this case (FIG. 7) is to make the necklace shorter or longer by moving both the knot 52 along the length of the Anchor side cord 50 and the knot 54 along the length of the Helix side cord 56. In an alternative embodiment any movable item attached, connected, or formed on the length of the necklace cord larger than the Anchor Ring opening 22 (FIG. 2a) or Helix opening 24 (FIG. 2b) can be a stop element used to adjust the size of the necklace.

Whereby the present invention has been shown to be used as a single-piece clasp for jewelry items using cord-type construction, along with the ability to have the size/length of said jewelry items adjusted.

Thus, while a particular preferred embodiment, a number of alternative embodiments of the present invention, and methods for using the same, have been shown and described, it will be apparent to those skilled in the art that many modifications and variations can be made, while not departing from the spirit and the scope of the present invention as defined by the following encompassing claims.

I claim:

1. A method for using an anchored connector, said connector comprised of a series of spaced coils and an anchor section, as a clasp to connect an item having a loose cord member with a stop element, said method comprising of the steps:

(a) holding the stop element on the loose cord member at the end of the spaced coils closest to the anchor section (b) wrapping the loose cord member around said series of spaced coils in the direction of the coils (c) pulling the loose cord member outward from the end of the coils furthest from the anchor section, along the center line of the coils (d) letting go of the stop element, when the loose cord member is pulled into the center of said series of spaced coils, said stop element seated at the end of the coils closest to the anchor section whereby the loose cord member unable to pull through the series of spaced coils is secured in the connector.

2. The method of claim 1, which said stop element is a knot.

3. The method of claim 1, in which said stop element is an item attached to said loose cord member.

4. The method of claim 1, in which said stop element is a movable stop element.

5. A method for adjusting the sin of an item hung around a person's body part using cord construction, where said hung item is comprised of two cord members attached to two sides of a non-shifting ornament, said members each having a movable stop element and where opposing member ends use a connector, said connector comprised of an anchor section and a series of spaced coils, as a clasp, said method comprising of the steps:

(a) threading one cord member through the anchor section (b) attaching one movable stop element to the cord member threaded through the anchor section, at a point equal to one-half the amount of length to be adjusted (c) placing the second stop element on the opposing second cord member at the position equal to that of the stop element on the cord member threaded through the anchor section (d) holding the second stop element on the second cord member at the end of the spaced coils closest to the anchor section (e) wrapping the second cord member around the series of spaced coils in the direction of the coils (f) pulling the second cord member outward from the series of coils in a direction opposite the anchor section along the center line of the coils (g) letting go of the second stop element, when the second cord member is pulled into the center of the series of coils, the second stop element seated at the end of the coils closest to the anchor section whereby the item hung around a person's body part is adjusted equally on both sides thus having the ornament hanging centered.

6. The method of claim 5, in which said ornament is more than one.

* * * * *